United States Patent Office.

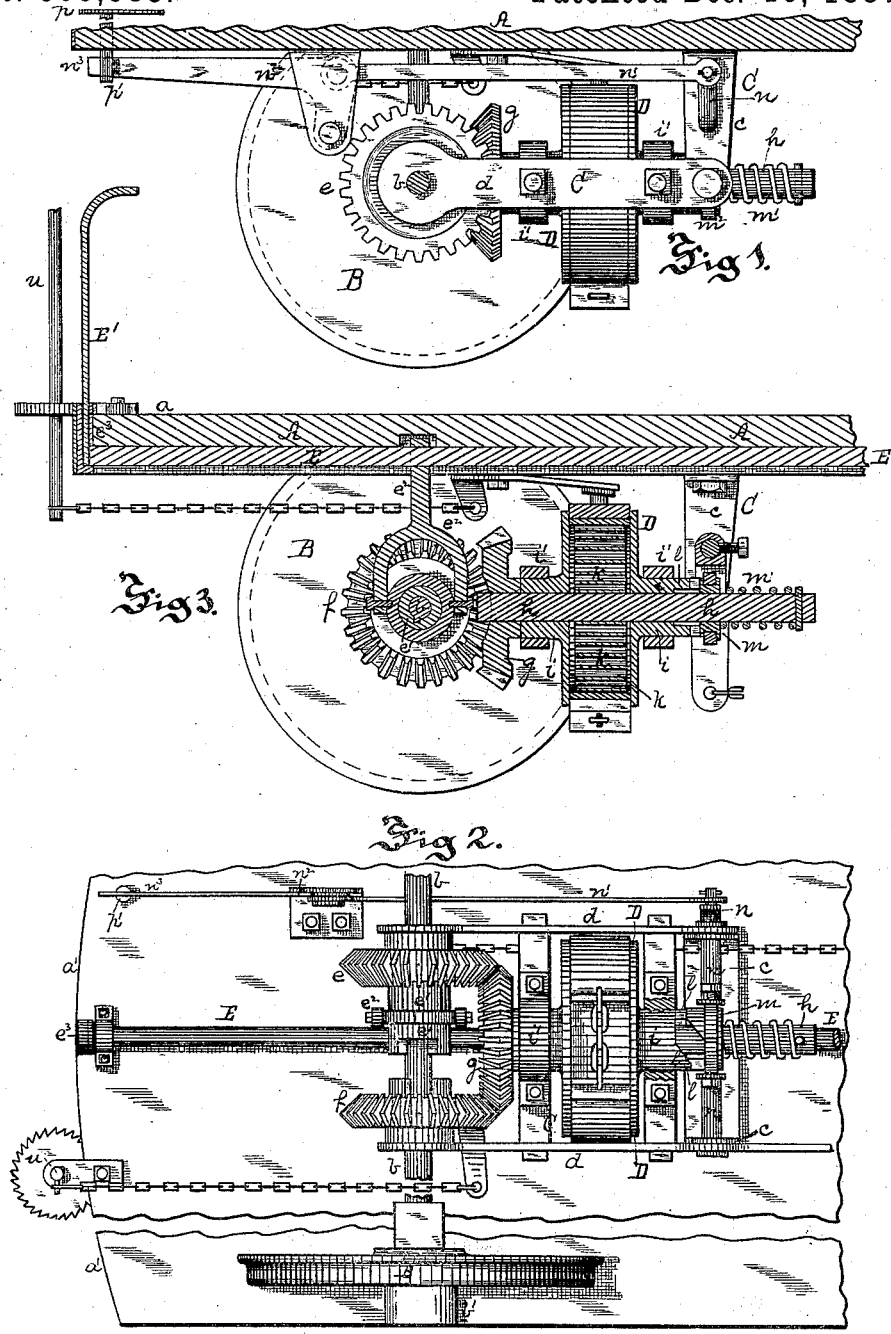

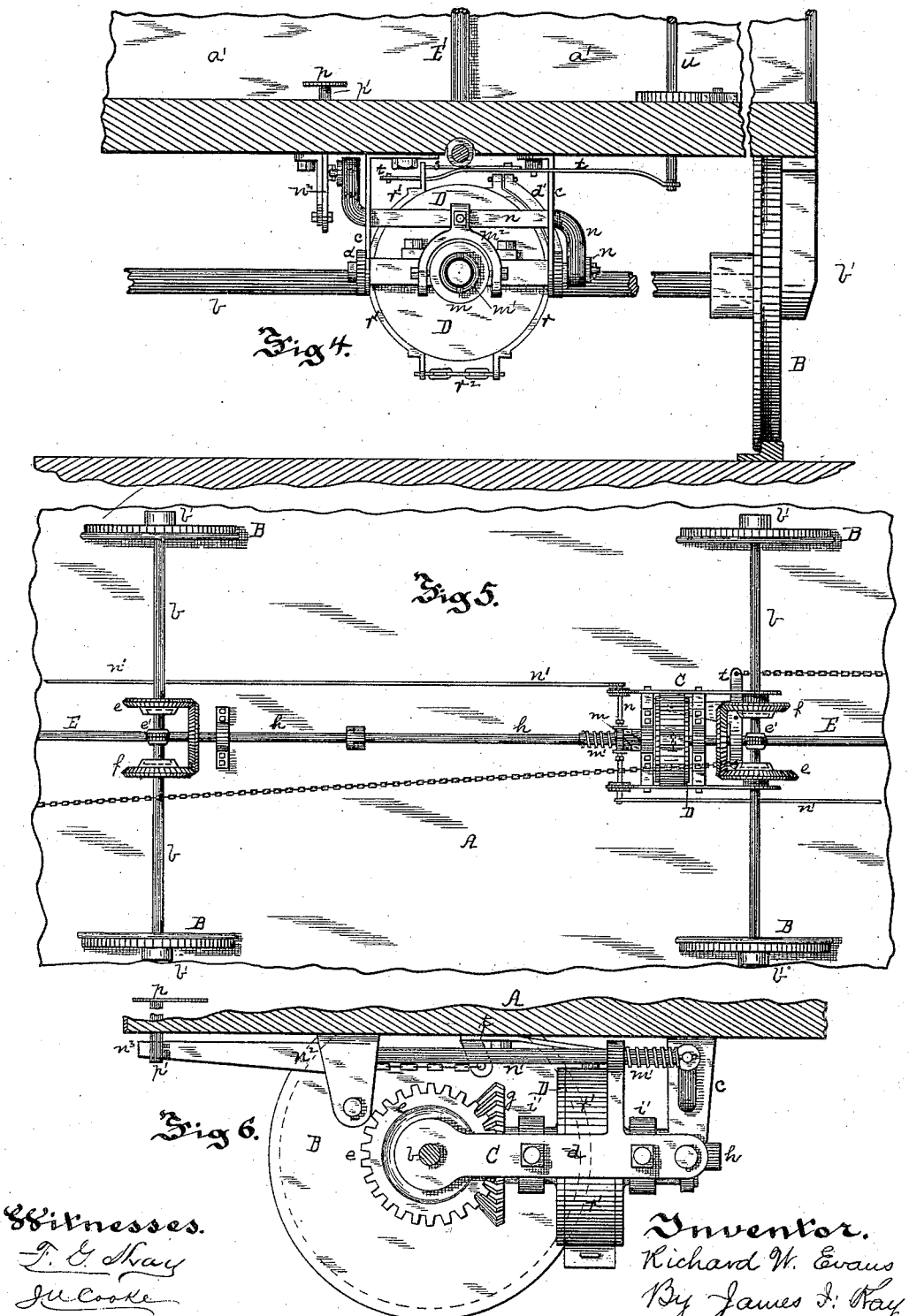

RICHARD W. EVANS, OF PITTSBURG, PENNSYLVANIA.

CAR BRAKE AND STARTER.

SPECIFICATION forming part of Letters Patent No. 309,383, dated December 16, 1884.

Application filed July 14, 1884. (No model.)

*To all whom it may concern:*

Be it known that I, RICHARD W. EVANS, of Pittsburg, in the county of Allegheny and State of Pennsylvania, have invented a new and useful Improvement in Car Brakes and Starters; and I do hereby declare the following to be a full, clear, and exact description thereof.

My invention relates to the car-brakes of railroad-cars, having special reference to the brakes employed on street-railways, where the car has often to pass up and down heavy grades, though it may also be well applied to advantage in connection with power-railways on level road-beds.

The car-brakes heretofore in general use on railways have been formed of certain levers extending under the car and secured to the car-body, and connected to brake-shoes carrying blocks the faces of which bear against the treads of the car-wheels, and thus operate to check or lock the car. This form of brakes has no means whatever for storing for future use the power which might be obtained where the cars were passing downgrade or being stopped, and as the faces of the blocks bore against the tread of the car-wheels, and these car-wheels, especially where the tracks were wet, were liable to carry up with them the fine particles of sand or dirt on the track, these blocks were extremely liable to wear, the ordinary blocks lasting only from six to eight weeks. As all the friction in checking or stopping the car was brought upon the periphery or working-face of the car-wheels, it is evident that the wear in braking the car came not only on the brake-blocks, but also on the working-faces, and that the car-wheels were worn out much more rapidly in this way. To overcome some of these difficulties and to take up the power obtained by the stopping for use in starting it again, apparatus has been devised having connections between the car-axle and spring apparatus, my invention relating to apparatus of this general description, and its object being to improve this class of apparatus so as to store the power necessary to check the speed of the car in descending grades or stop it entirely for use when the car is started, and bring the apparatus under such control of the driver that he may employ little or much, as he may desire, may check the car suddenly or gradually, as desired, may back the car when necessary, and so may relieve the horse from many of the heavy strains incident to hauling street-cars.

It consists, essentially, in combining with the car-axle a suitable frame carrying a drum in which a spring is inclosed, and on which the car-brake apparatus operates, and suitable connections between these parts and the axle, whereby when the brake is applied the friction on the outer surface of the drum causes the coiling of the spring, and thus stores the power thereof, so that when the car is started or traveling upgrade the power of the spring may be applied to the wheels and the car started or assisted thereby.

It also consists in certain improvements in the construction of the drum and the brakes applied thereto, the connection between the drum and its spring and the axle, and the means for operating the apparatus in braking, running free, or applying the power obtained to the car.

To enable others skilled in the art to make and use my invention, I will describe its construction and operation, referring to the accompanying drawings, in which—

Figure 1 is a side view, the car-wheel being removed, of the apparatus as applied to one axle of the car. Fig. 2 is a bottom view of the same. Fig. 3 is a longitudinal central section thereof. Fig. 4 is an end view illustrating the application of the brake to the drum. Fig. 5 is a bottom view illustrating the application of the apparatus to both axles of the car, and Fig. 6 illustrates a modification of the apparatus.

Like letters of reference indicate like parts in each.

The car-body A may be of any desired construction, that generally employed having a platform, *a*, at each end thereof, provided with a dash-board, *a'*. The car-wheels B are rigidly secured to their axles *b*, which are mounted in any suitable spring-bearings, *b'*, secured to the car-body, the construction of these parts being well known, and it is not necessary to refer further to them.

C represents the frame of my improved brake apparatus, which is formed of a vertical standard or hanger, c, secured to the bottom of the car, and having pivoted at its base the horizontal frame d, the opposite end of the frame fitting around one car-wheel axle b, so that as the axle moves up and down in its spring-bearings the horizontal body d of the frame will follow its movement and hold in proper line therewith, this being necessary in order that the gearing, hereinafter referred to, may mesh properly in all positions of the axle.

The apparatus is generally secured to one axle and operates only thereon, though it may be easily applied to both axles of the car, as is illustrated in Fig. 5. It will first be described as applied to but one axle. The axle b carries the two beveled pinions e f, these pinions turning loosely thereon and meshing with the beveled pinion g, mounted in the horizontal portion d, and rigidly secured at one end of the shaft h.

Between the beveled pinions e f is the clutch $e'$, this clutch being connected to the axle b by means of a feather, and engaging with the said beveled pinions by a suitable clutch-connection, frictional or angular. The clutch $e'$ is connected by a yoke, $e^2$, with the bar E, which is mounted in suitable bearings, and extends from end to end in the center of the car, and is provided at each end with a socket, $e^3$, for the reception of a suitable bar or lever, E′, the clutch being operated by this bar and thrown into connection with either pinion e or f, according to the direction in which the car is moving.

Mounted in the horizontal body d of the frame C is the drum D, this drum having the hollow necks or collars i fitting within the bearings $i'$, and the shaft h carrying the beveled pinion g, extending through this drum and being mounted in said hollow necks.

Inclosed within the drum D is the spring k, being connected to the shaft h and drum D, so as to be coiled around said shaft when the drum is held from turning as the brakes are applied thereto, as hereinafter described. This spring should be of sufficient power to exert a force upon the axle of the car sufficient to overcome the inertia thereof when the car is not moving, and thus start the car.

On the collar i, on the opposite side of the drum from the beveled pinion g, are the ratchet-lugs l, which extend out beyond the bearings $i'$ and engage with the spring-clutch m, mounted on the sliding feather on said shaft h, and having the spring $m'$ confined between it and a pin extending through the shaft, so that this spring-clutch m is pressed out against and engages with said lugs l, thus forming a pawl-and-ratchet connection between the shaft and drum to take up and retain the power of the spring as it is coiled within the drum. The spring-clutch m is mounted in the yoke $m^2$, secured on the bar n, extending through said hanger c, and having cranks at each end thereof, so that by means of said cranks the spring-clutch m may be drawn out of connection with the ratchets l of the drum. Secured to these cranks n are the rods $n'$, extending to either end of the car, and connected to the lever $n^2$, mounted in a suitable bracket, and having the arm $n^3$, which extends forward under a hole in the car-floor, and a bar, $p'$, having the shoe p at the top thereof, extends through this hole and fits over the end of the arm $n^3$ of the lever, so that the driver, by pressing on this shoe, may, through the lever $n^2$ and rod $n'$, draw the spring-clutch out of connection with the drum, and so free the spring and apply its power, through the gear and clutch above referred to, to the axle.

If desired, the spring $m'$ may be mounted on the rods $n'$, confined between the cranks and a bracket of the frame C, or secured to the bottom of the car, as shown in Fig. 6, instead of on the shaft h.

Any suitable brake apparatus may be employed with the drum D, that shown in the drawings being preferred by me, and having brake-blocks supported in shoes r r′, and corresponding in curve to the periphery of the drum. One shoe, r, is pivoted to the arm $d'$, extending up from the horizontal frame d, and extends around about one-third of the periphery of the drum, being connected at the base by means of a chain, $r^2$, with the other brake-shoe, $r'$, which is connected at its upper end by the bar or chain s with the lever t of the brake apparatus, said lever t having two arms extending out in different directions, and connected by suitable chains with the brake-levers u at the platforms of the car, said brake-levers being provided with the usual ratchet-wheel and pawl. The lever or bar E′, for operating the clutch $e'$ on the axle b, and the shoe p, for operating the spring-clutch m, may be transferred from one end of the car to the other and connected with the apparatus, as above referred to, so that both clutch apparatus can be operated from either end of the car. The apparatus as described is applied on one of the axles of the car; but where it is desired to employ it to brake on both axles the bar h is carried to the opposite axle and connected thereto by substantially the same clutch apparatus and beveled gear as employed with the other axle, so that the power will be applied to said shaft through either or both axles, and a suitable clutch is mounted on this axle and connected with the same bar, E, extending centrally along the car. Where both axles are connected with the brake apparatus, it is preferable that friction-clutches be employed on the axles to allow of the sliding of the clutch within its connection where both axles are not traveling at the same speed. To allow the movement of the shaft h where the axles move up and down in the spring-bearings of the car, the shaft h is made in two or more pieces connected by suitable couplings to allow of its movement; or the frame C may be journaled and supported by both axles, and not connected in any way to the car-body.

The operation is as follows: When the car is passing along a level grade, the driver, by means of the bar or lever E', moves the clutch $e'$ on the axle, so that it engages with neither beveled gear $e$ or $f$, and the car travels without any braking force being applied thereto. As soon, however, as he desires to check the speed of the car on passing down a grade, or to stop, he throws the lever E' to one side, thus causing the clutch $e'$ to engage with the proper beveled gear on the axle, and he then, through the brake-lever $u$, tightens up the brake on the drum D, the two brake-blocks being drawn together around said drum, and giving him a very strong braking-power. As the drum is thus held from turning by the friction of the brake apparatus thereon, the axle, as it turns through the beveled gear, turns the shaft $h$, and thus causes the coiling of the spring $k$ within the drum, and the spring clutch turning with said shaft $h$, and on each revolution thereof engaging with the ratchet-lugs $l$ on the hollow bearing $i$ of the drum, so storing the power of the spring within the drum. As the brake is applied the spring within the drum is thus gradually coiled until it is wrapped tightly around the shaft, and then on the further revolution of the shaft the drum D is turned with said shaft, and the brake apparatus around said drum gives all the necessary force for checking or stopping the car. When the car is stopped and it is desired to start it, the driver places his foot on the shoe $p$, and thus presses down the lever $n^2$, and through the crank-bar $n$ and yoke $m^2$ draws the spring-clutch $m$ out of connection with the drum, and the power of the spring is then applied through the shaft $h$, beveled gearing $g\ e$ or $g\ f$, and clutch $e'$ directly to the axle $b$, and turning said axle acts to start the car, thus overcoming the inertia of the car and relieving the horses from the severe strain of starting the heavy load which they are required to pull. As soon as the car is started sufficiently the driver lifts his foot from the shoe $p$, and thus frees the spring-clutch apparatus, and the spring $m'$ forces the clutch $m$ into connection with the drum, so that when the coiled spring is wound within the drum the driver can use any portion of the power so stored, according to the weight of the car and the distance he desires to carry it forward by the force of the spring. He can thus release one coil, or in ascending a grade the entire force stored within the drum, and on hilly roads the power thus stored will be found to ease materially the labor of starting the cars and hauling them up such heavy grades. It is also in many cases desirable to back the car, and this gives much trouble to the driver, as in street-cars a tongue is but seldom employed. By my apparatus, however, the driver, by a mere reversal of the lever, is able to back the car by the power stored in the drum above referred to; and to do this it is only necessary to reverse the clutch $e'$ on the axle—as, for example, to disconnect it from the beveled gear $a$ and connect it to the beveled gear $f$— and on disconnecting the spring-clutch apparatus, as above described, the power of the spring will be applied in such manner as to cause the car to travel backward.

In street-cars which are arranged to drive from either end, the driver, at the end of his trip, carries the lever E' and shoe $p$ to the opposite platform and connects them with the shaft E and the lever $n^2$ of the spring-clutch apparatus at that end of the car, and the apparatus is then ready for use. As the brakes operate on the drum, and there is no opportunity for the entrance of wet sand between the faces of the brace-blocks and the drum, it is evident that the brake-blocks are not nearly so liable to wear as where they bear on the peripheries of the car-wheels, the saving from this source being at least one hundred per cent. The apparatus also relieves the body of the car from very severe strains, as the ordinary brake apparatus is secured to the bottom of the car and the power or strain is carried through a separate connection to the car-wheels, the body of the car being thrown on the strain whenever the brakes are applied, and the wood-work of the car being soon loosened by these strains. In my improved apparatus, however, the power in braking the car is applied to the center of the axle, and, except in supporting the frame, is not connected to the car-body, and all these strains are therefore done away with.

The apparatus can be employed to move the car either backward or forward, and sufficient power may be stored to revolve the car-wheels as high as twelve revolutions at one time, any portion of this power being applied according to the will of the operator. By simply shifting the lever E', even where the brakes are applied, the driver can free the clutch from the beveled gear, and thus leave the car free of the brake apparatus, and he can again apply the brake apparatus by simply throwing the clutch into connection with the beveled gear, the brake being applied to the drum and no attention being required by it.

Where it is desired to stop the car more suddenly than the brake apparatus will operate, all that is necessary is to reverse the clutch when the power is applied through the opposite bevel-gear to the shaft $h$, which is held from turning in that direction by the spring-clutch $m$, thus backing the wheels.

The apparatus can be operated by unskilled persons, requiring but little instruction before it can be employed to advantage by any inexperienced driver.

Where the spring apparatus is not desirable, the apparatus may be employed only for braking purposes, and will be found to possess many advantages over the car-brakes now in use.

What I claim as my invention, and desire to secure by Letters Patent, is—

1. In combination with the car-axle, the drum D, inclosing and secured to the coiled spring K, the shaft $h$, secured to said spring and carrying the beveled gear $g$, the beveled gears $e$ $f$, and the sliding clutch $e'$, keyed to the car-axle, and brake apparatus applied to said drum, substantially as and for the purposes set forth.

2. In combination with a car-axle, a drum inclosing a spring, suitable connections between the spring and axle, brake apparatus applied to said drum, and spring-clutch apparatus, substantially as and for the purposes set forth.

3. In combination with a car-axle, a drum inclosing a spring, suitable connections between said spring and axle, spring-clutch apparatus, and lever mechanism for operating the same, substantially as and for the purposes set forth.

4. In brake apparatus, the frame C, formed of the hanger $c$ and horizontal body $d$, mounted at one end on the axle $b$, in combination with spring-bearings for said car-axle, substantially as and for the purposes set forth.

5. The combination of the frame C, having the bearings $i'$, the drum D, having the hollow bearings $i$, the shaft $h$, mounted in said hollow bearings, and carrying the beveled gear $g$, engaging with gear on the axle, and the spring inclosed within the drum and connected to the drum and shaft, substantially as and for the purposes set forth.

6. In brake apparatus, the drum D, having the hollow bearings $i$ and ratchet-lugs $l$ on one bearing, in combination with the shaft $h$, spring-clutch $m$, keyed thereto and engaging with said lugs, spring connected to said shaft and drum, and mechanism for rotating said shaft, substantially as and for the purposes set forth.

7. In combination with the shaft $h$, drum D, and spring inclosed within said drum, the spring-clutch $m$, secured to said shaft and engaging with said drum, yoke $m^2$, crank-bar $n$, and mechanism for operating said bar, substantially as and for the purposes set forth.

8. In combination with the spring-clutch mechanism, the lever $n^2$, bar $n'$, connecting it thereto, and the removable shoe $p$, extending through the platform and engaging with said lever, substantially as and for the purposes set forth.

9. In car-brake apparatus, the combination, with the frame C, carrying the drum D, mounted therein, and having the arm $d'$, extending up from said frame, the brake-shoe $r$, supported by said arm, and brake-shoe $r'$, fitting against said drum, chain $r^2$, and bar $s$, leading to the brake-lever, substantially as and for the purposes set forth.

In testimony whereof I, the said RICHARD W. EVANS, have hereunto set my hand.

RICHARD W. EVANS.

Witnesses:
JAMES I. KAY,
J. U. COOKE.